United States Patent [19]

Terry, Jr. et al.

[11] Patent Number: 5,103,672
[45] Date of Patent: Apr. 14, 1992

[54] FLEXIBLE TRANSMITTER AND FLUID LEVEL GAUGING PROBE

[75] Inventors: Vincent J. Terry, Jr., Dix Hills; Eugene J. Schmidt, Bohemia; Michael J. Loftus, Medford; Kenneth J. Pedersen, Miller Place; Richard B. Orbell, Saint James; Vidan Jovanovic, Flushing, all of N.Y.

[73] Assignee: Ragen Data Systems, Inc., Islip, N.Y.

[21] Appl. No.: 588,537

[22] Filed: Sep. 26, 1990

[51] Int. Cl.⁵ .............................................. G01F 23/26
[52] U.S. Cl. ................................... 73/304 C; 73/1 H; 361/284
[58] Field of Search ............................. 73/304 C, 1 H

[56] References Cited

U.S. PATENT DOCUMENTS

| | | | |
|---|---|---|---|
| 2,945,165 | 7/1960 | Franzel | 73/304 C |
| 3,228,245 | 1/1966 | Edwards | 73/304 C |
| 3,283,577 | 11/1966 | Schuck | 73/304 C |
| 3,543,046 | 11/1970 | Tiffany . | |
| 4,080,562 | 3/1978 | Rubel et al. . | |
| 4,296,630 | 10/1981 | Jung et al. | 73/304 C |
| 4,392,378 | 7/1983 | Pitches et al. . | |
| 4,412,270 | 10/1983 | Weitz, Jr. | 73/304 C X |
| 4,418,569 | 12/1983 | Kuhnel . | |
| 4,418,571 | 12/1983 | Asmundsson et al. . | |
| 4,467,646 | 8/1984 | Berryman et al. . | |
| 4,528,839 | 7/1985 | Blachard et al. | 73/1 H |
| 4,564,881 | 1/1986 | Kant et al. | 73/304 C |
| 4,601,201 | 7/1986 | Oota et al. | 340/870.16 X |
| 4,621,227 | 11/1986 | Venema . | |
| 4,689,991 | 9/1987 | Beckley et al. | 361/284 X |
| 4,806,847 | 2/1989 | Atherton et al. | 73/304 C |

Primary Examiner—Daniel M. Yasich
Attorney, Agent, or Firm—Fitzpatrick, Cella, Harper & Scinto

[57] ABSTRACT

A fluid level gauging probe having a flexible transmitter wherein the flexible transmitter includes a first flexible electrically conductive conduit flexibly and substantially coaxially supported within a second flexible conduit. The second flexible conduit includes an electrically conductive probe conduit portion forming an electrical capacitance member with the first conduit. Non conductive spacers are provided for flexibly and substantially coaxially supporting the first flexible conduit within the second flexible conduit. Non conducting locating pins are radically disposed through longitudinal slots in the first and second flexible conduits for the attaching the flexible transmitter to a probe housing and for maintaining the first and second flexible conduits in a substantially fixed longitudinal relationship when the flexible transmitter is flexed. Circuitry, including electrical leads to the first flexible conductive member and the probe portion of the second flexible conduit, is provided for measuring the capacitance of the electrical capacitance member and for detecting the level of fluid in a container as a function of the measured capacitance.

34 Claims, 4 Drawing Sheets

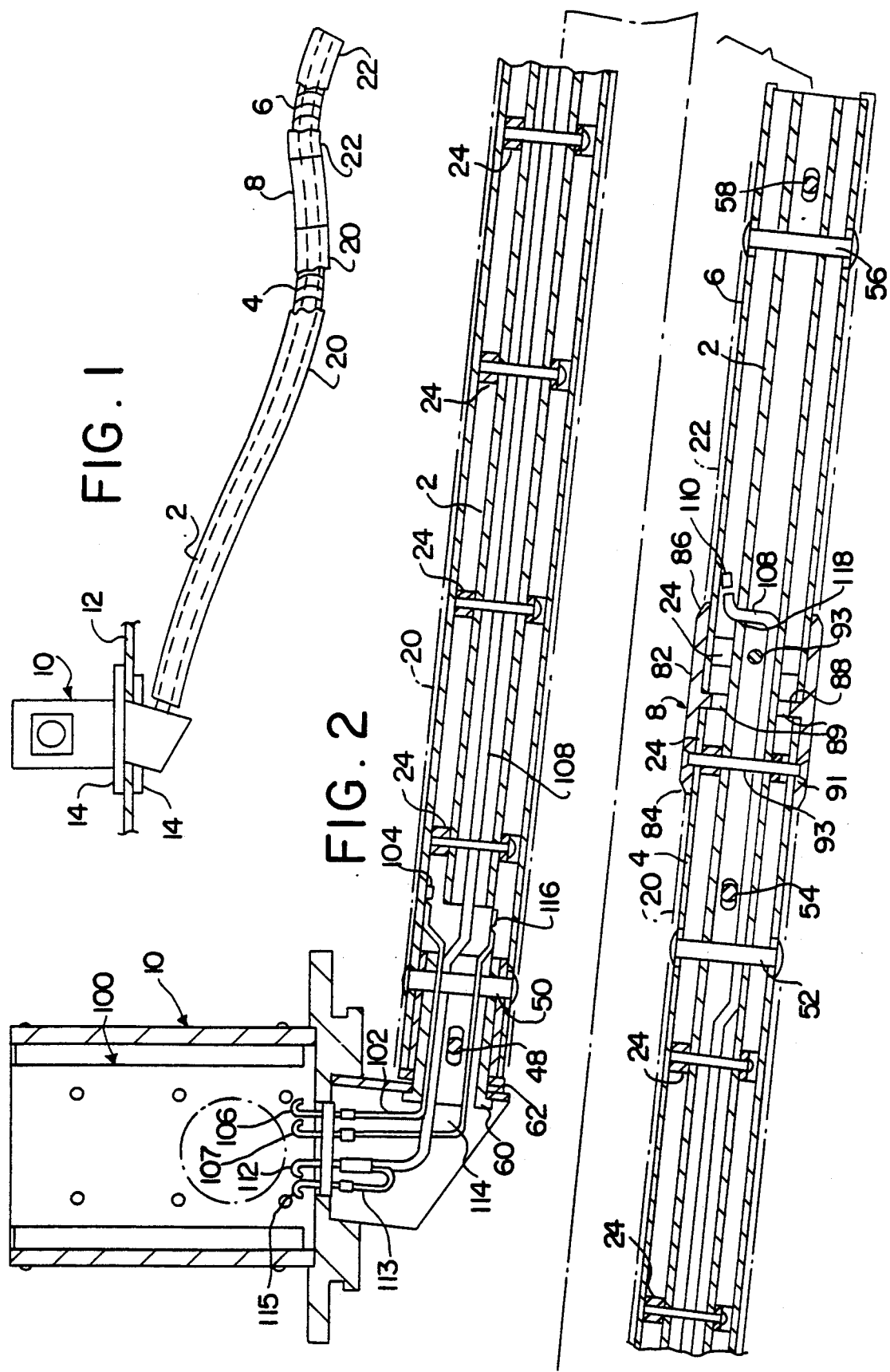

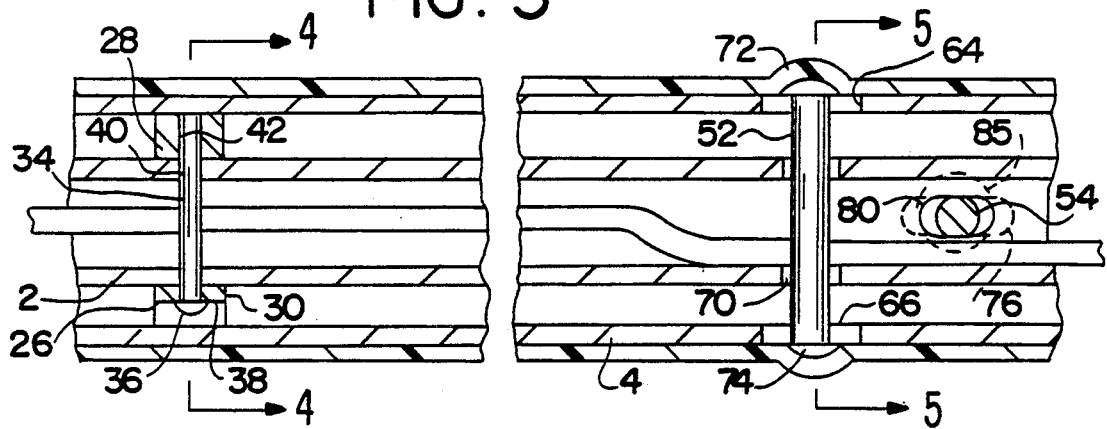
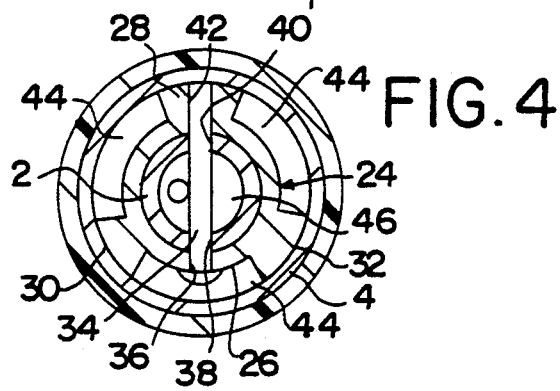
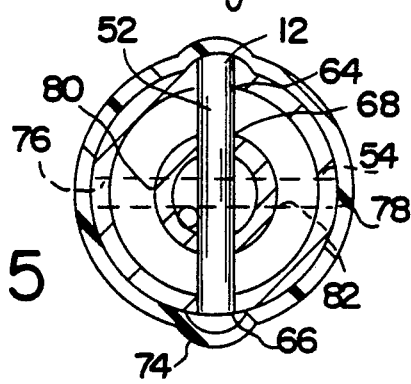
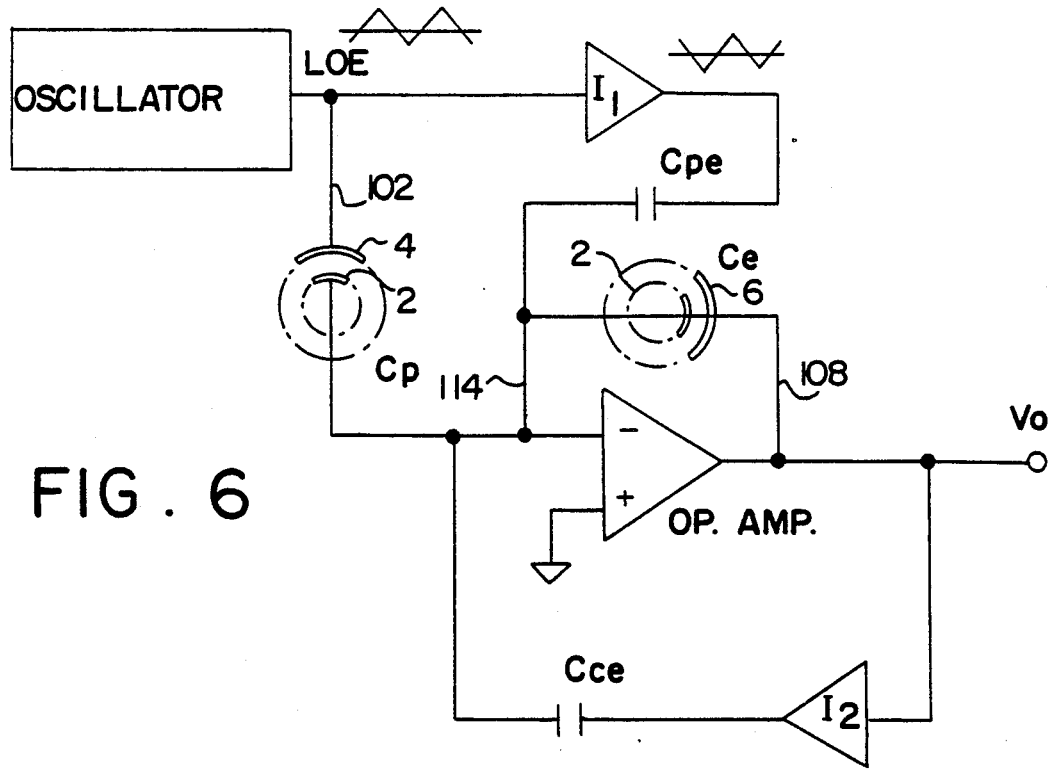

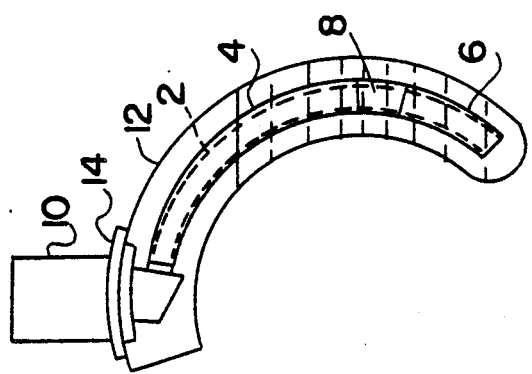
FIG. 7
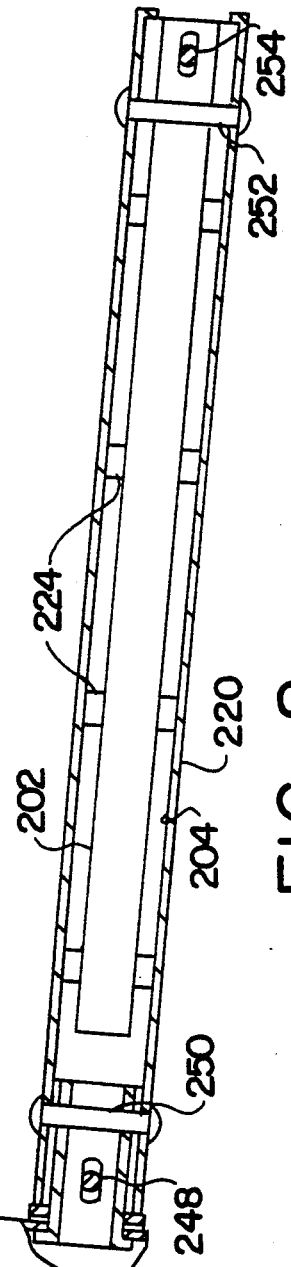
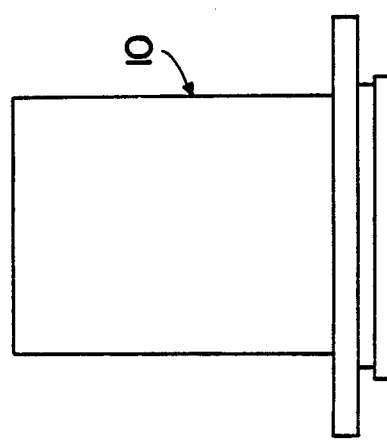
FIG. 8

FLEXIBLE TRANSMITTER AND FLUID LEVEL GAUGING PROBE

BACKGROUND OF THE INVENTION

The present invention relates generally to apparatus for gauging the fluid level in a container, and more particularly to probe transmitter apparatus flexible in multiple planes for determining the fluid level within the container as a function of electrical capacitance. The invention finds particular utility in the aerospace field, for measuring the level of oil in a tank or compartment of an aircraft engine.

Fluid level gauges for aircraft oil tanks must meet stringent structural and operational requirements. Thus, aircraft oil tanks may be arranged in irregular shapes. For example, the oil tank of an A-4 jet aircraft engine has a saddle-shape which sweeps back and wraps around the jet engine. Moreover, such oil tanks often are both elongated and congested with convoluted internal piping and other structures, such as support structure. Therefore, it is desirable to provide a fluid level probe that is capable of flexing in multiple planes to allow insertion and withdrawal for maintenance. Also, the piping and other internal structure is often composed of metal or other conductive materials. Thus, it is necessary to provide a flexible probe which will not electrically short-out when in contact with such conductive internal structure. Finally, aircraft engine oil tanks present a hostile environment, with temperature gradients varying widely over short periods of time (e.g., engine startup) and reaching highs of about 400° F. Accordingly, a fluid level probe must be composed of materials that operate efficiently, reliably and dependably over a wide range of temperatures in a hostile environment.

In the past, in order to determine the level of oil in the tank of an aircraft engine, point level sensors have been provided. For example, a first point level sensor is located at a position in the tank to indicate an 80% fuel level and a second point level sensor is positioned in the tank at a 20% fuel level. However, such point level sensor arrangements have a drawback in that they monitor only discrete levels and may require multiple sensors, which can increase the complexity of the system and decrease its reliability. Also, a leak or sudden loss of oil may not be detected until virtually no oil is left, resulting in dangerous and costly engine burnout or failure.

Variable capacitance continuous detecting probes for determining the level of fluid in a tank or container are known. For example, U.S. Pat. No. 4,806,847 describes a sensor for sensing the level of oil or transmission fluid in a tank or vessel. The sensor has a probe, including a pair of electrodes forming a level detecting capacitor, adapted to extend in the vessel to detect the level of the liquid. A reference capacitor is included which has substantially the same capacitance as the level detecting capacitor when no dielectric liquid is present between the electrodes of the level detecting capacitor. Circuitry is provided for measuring the capacitance of each capacitor and for deriving from the capacitance measurements a signal proportional to the level of the dielectric liquid at the sensor. However, such variable capacitance continuous detecting probes have a drawback in that they utilize a rigid probe transmitter structure that cannot be inserted into irregularly shaped tanks. Also, when inserted into an engine oil tank, such probes may present a conductive surface that can electrically short-out on conductive internal structures.

SUMMARY OF THE INVENTION

In order to overcome the disadvantages of the prior art apparatus and methods noted above, it is an object of the present invention to provide a single apparatus for continuously gauging the oil level in an engine tank.

It is another object of the present invention to provide a flexible probe apparatus for continuously gauging the oil level in an irregularly shaped tank.

It is another object of the present invention to provide a flexible probe apparatus for continuously gauging the fluid level in a tank having convoluted internal structure.

It is another object of the present invention to provide a flexible metal probe gauging transmitter that can withstand environments hostile to nonconductive flexible tubing.

It is another object of the present invention to provide a flexible metal probe gauging transmitter that will not short out on metal structures internal to the tank.

It is another object of the present invention to provide a flexible probe apparatus that can be profiled to the height and volume characteristics of various tanks.

It is another object of the present invention to provide a flexible probe apparatus having a variable capacitance per unit length.

It is another object of the present invention to provide a flexible probe apparatus for gauging the level of a fluid having dielectric properties that vary substantially over a wide range of operating temperature gradients over a short period of time.

It is another object of the present invention to provide a light weight flexible probe apparatus for gauging the level of oil in an aircraft engine tank.

These and other objects and advantages are achieved by the present invention, a transmitter including a first electrically conductive flexible in multiple planes conduit flexibly supported within a second conduit flexible in multiple planes having an electrically-conductive probe portion forming a first electrical capacitance member with the first conduit. In another embodiment of the present invention, the second flexible conduit includes an electrically conductive probe portion forming a first electrical capacitance member with the first conduit, an electrically conductive compensator portion forming a second electrical capacitance member with said first conduit, and a nonconductive collar forming an insulating joint between the probe portion and the compensator portion. In yet another embodiment, the first flexible conductive conduit may be segmented, each segment having a respective diameter selected as a function of the fluid volume per unit length of the transmitter.

In another aspect of the present invention, nonconductive spacers are provided for preventing the first flexible conduit from contacting the second flexible conduit, and for maintaining a substantially constant radial distance between the first flexible conduit and the second flexible conduit when the probe gauging transmitter is flexed.

In another aspect of the present invention, locating pins are provided through longitudinal slots radially disposed in the first flexible conduit and the second flexible conduit, for maintaining a substantially fixed longitudinal relationship between the first and second conduits when flexed.

In another aspect of the present invention, electrical leads are provided to the electrically conductive portions of the first and second flexible conduits, and circuitry is provided for measuring the respective capacitances therebetween, and for determining the level of fluid in the container as a function of the measured capacitances.

DESCRIPTION OF THE DRAWINGS

A preferred embodiment of the apparatus of the invention and the manner of its use is described below and illustrated in the attached figures in which:

FIG. 1 is a perspective view of a flexible probe gauging transmitter and fluid level gauging probe of the present invention;

FIG. 2 is a longitudinal cross-sectional view of FIG. 1, illustrating details of a preferred embodiment of the present invention;

FIG. 3 is an enlarged longitudinal cross-sectional view of a portion of FIG. 2, illustrating details of a spacer and a locating pin pair of the preferred embodiment;

FIG. 4 is a cross-sectional view of the spacer illustrated in FIG. 3;

FIG. 5 is a cross-sectional view of the locating pin pair illustrated in FIG. 3;

FIG. 6 is a schematic diagram of a circuit for detecting the capacitance of a fluid within the flexible transmitter of the preferred embodiment and for providing a signal indicating the level of the fluid therein;

FIG. 7 is a cut-away view of an aircraft engine oil tank having a fluid level gauging probe of the present invention mounted therein;

FIG. 8 is a schematic longitudinal cross-sectional view of an alternative embodiment of a flexible transmitter and fluid level gauging probe of the present invention.

DETAILED DESCRIPTION OF THE PREFERRED EMBODIMENTS

Figure 9:
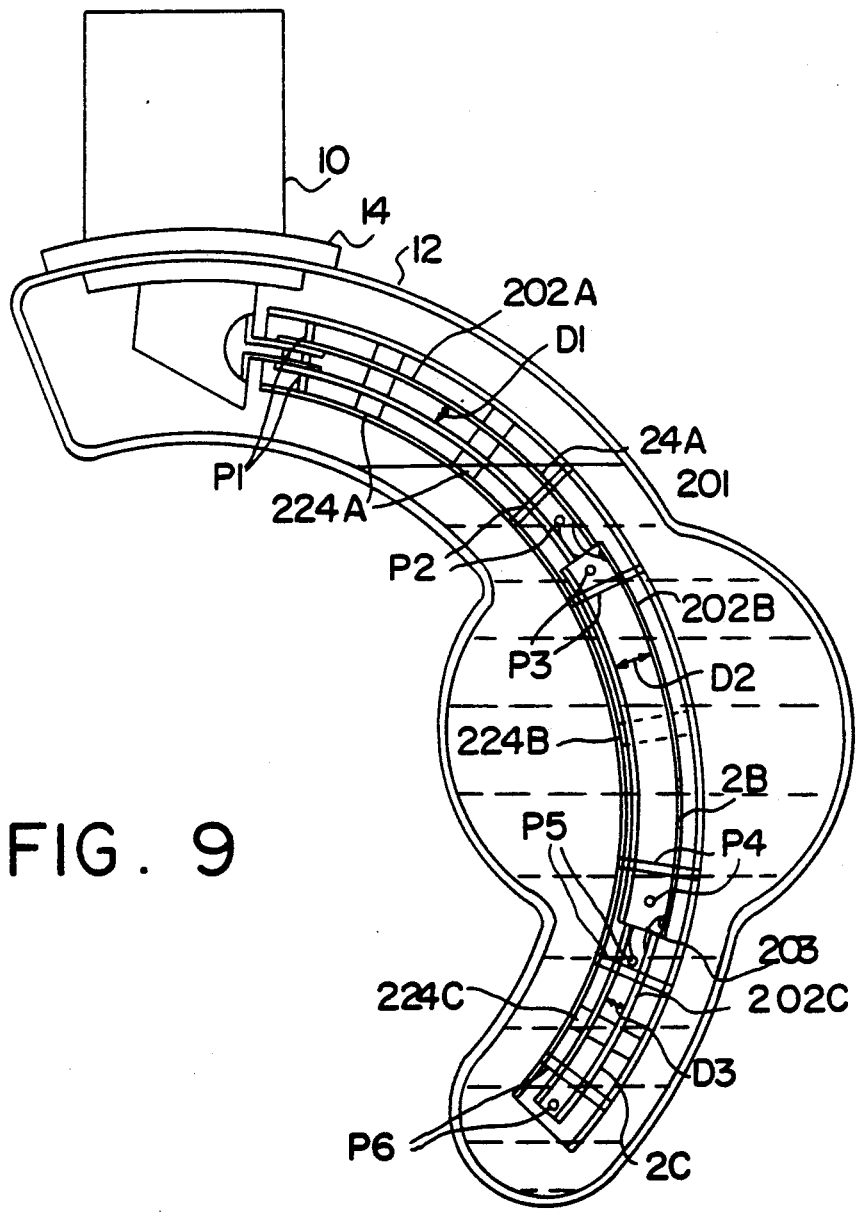
FIG. 9 is a schematic longitudinal cross-sectional view of a second alternative embodiment of a flexible transmitter and fluid level gauging probe of the present invention.

Referring now to the drawings, wherein like reference numerals represent like or similar structures throughout the drawings, a flexible transmitter and fluid level probe of the present invention are illustrated in FIG. 1. The flexible transmitter generally includes a first flexible conduit 2 forming a high impedance element (also known as the "inner conduit," shown by broken lines), a flexible probe outer conduit portion 4, a flexible compensator outer conduit portion 6, and a collar 8. The outer conduit probe portion 4 and the outer conduit compensator portion 6 are flexibly covered, respectively, by a probe insulating sleeve 20 (illustrated broken in part to show probe portion 4) and a compensator insulating sleeve 22 (illustrated broken in part to show compensator portion 6). The probe insulating sleeve 20 and compensator insulating sleeve 22 are preferable composed of a high temperature heat shrinkable material, such as a heat shrinkable polytetrafluoroethylene material commercially available as TEFLON ®. The flexible transmitter is attached to a fluid level probe housing 10, which is conventionally mounted in a wall 12 of a fuel oil tank, by means of a flange 14 (see also FIG. 7).

Referring now to FIG. 2, a preferred embodiment of the flexible transmitter and fluid level probe of FIG. 1 are shown in detail in a longitudinal cross-sectional view. Each of inner conduit 2, outer probe conduit portion 4 and outer compensator conduit portion 6 is composed of a flexible conductive material, e.g., an interlocking or convoluted metal hose or tube as indicated in FIG. 1. In the preferred embodiment, inner conduit 2 is composed of 5/16 inch dia. ×0.41 o.d. interlocked 302 stainless steel hose manufactured by the Penflex Company, Frasier, Penna. Likewise, outer probe conduit portion 4 and outer compensator conduit portion 6 are composed of ¾ inch dia. ×0.86 o.d. interlocked 302 stainless steel hose manufactured by the Penflex Company.

Collar 8 comprises a cylindrical body 82 having chamfered shoulders 84,86 and an annular insulating rib 88 for receiving probe portion 4 and compensator portion 6. In this manner, a continuous second flexible conduit is formed by probe portion 4, collar 8 and compensator portion 6. Collar 8 is composed of a nonconductive material, e.g. (TFE) poly(tetrafluroethylene) or TEFLON 100 also known as FEP. The height and width of insulating rib 88 is determined to provide electrical insulation between probe portion 4 and compensator portion 6, and to provide an annular fluid passage 89 between insulating rib 88 and inner conduit 2. The length of collar 8 is determined to provide a reliable insulating joint between probe portion 4 and compensator portion 6 of the second conduit and to maximize mechanical flexibility of the transmitter.

Inner conduit 2 is flexibly and substantially coaxially supported within the second flexible conduit by a plurality of spacers 24. In the preferred embodiment, spacers 24 are disposed between inner conduit 2 and respective probe portion 4 and compensator portion 6 of the second conduit at approximately 4 inch intervals. In the preferred embodiment, spacers 24 also are disposed within collar 8 on each side of insulating rib 88 to provide reliable spacing between the respective conduits at the collar joint. In order to maximize reliable spacing one of the spacers 24 disposed within collar 8 is rotated 90° relative to the other spacer 24 disposed within coller 8, and collar 8 is provided with radially-disposed, counterbored slots 91 for receiving spacer pins 93.

Referring particularly to FIGS. 3 and 4, a spacer 24 of the preferred embodiment is illustrated in detail. Spacer 24 comprises a ring shaped body 26 circumscribing inner conduit 2, and three radially extending spokes 28,30,32, arranged at approximately 120° intervals, for maintaining a substantially fixed radial spacing between inner conduit 2 and probe portion 4. It will be appreciated that the present description of spacer 24 between inner conduit 2 and probe portion 4 is illustrative only and is applicable by analogy to an application of spacers 24 between inner conduit 2 and compensator portion 6. Spacers 24 preferably are fixed longitudinally relative to inner conduit 2. In a preferred embodiment, a fixing pin 34 is inserted through ring slot 36, fixing slots 38,40 radially disposed in inner conduit 2, and terminal slot 42 radially disposed in spacer spoke 28. It will be appreciated that the ring and spoke design of spacer 24 provides fluid passages 44 between inner conduit 2 and probe portion 4 (see FIG. 4). Also, the spacer and fixing pin design provides fluid passages 46 within inner conduit 2.

Spacers 24 are composed of a nonconductive material. In the preferred embodiment, spacers 24 are composed of poly(tetrafluoroethylene) (PTFE) or FEP i.e. TEFLON 100, which is particularly suited to the hostile environment of an engine oil tank. However, those skilled in the art will appreciate that other nonconductive materials may be used in applications which present a less hostile environment. For example, a glass reinforced nylon may be used in lower temperature applications.

Fixing pins 34 also are composed of a nonconducting material. In the preferred embodiment, fixing pins 34 are composed of poly(chlorotrifluroethylene), commercially available as Kel-F. Thus, it will be appreciated that the nonconductive spacer and fixing pin arrangement maintains inner conduit 2 and probe portion 4 in a nonconductive, spaced-relationship.

Referring again to FIG. 2, inner conduit 2, probe portion 4 and compensator portion 6 are attached to housing 10 and substantially fixed in longitudinal relationship by a plurality of locating pins 48,50,52,54,56,58. Specifically, in the preferred embodiment, probe portion 4 is attached to housing 10 by locating pins 48,50 in structural cooperation with inner support sleeve 60 and nonconductive outer support sleeve 62 of housing 10. Locating pins 52,54 disposed at the distal end of probe portion 4 maintain inner conduit 2 and probe portion 4 in substantially fixed longitudinal relationship. Locating pins 56,58 disposed at the terminal end of compensator portion 6 maintain inner conduit 2 and compensator portion 6 in substantially fixed longitudinal relationship. It will be appreciated that because inner conduit 2 is continuous through collar 8, where probe portion 4 and compensator portion 6 are joined, this arrangement of locating pins 52,54,56,58 maintains probe portion 4 and compensator portion 6 in a substantially abutting relationship with insulating rib 88, and it is not necessary to provide affixing means, such as bonding, between collar 8 and respective probe portion 4 and compensator portion 6. Moreover, this arrangement maximizes the flexibility of the fluid level gauging probe transmitter.

Referring particularly to FIGS. 3 and 5, a pair of locating pins of the preferred embodiment are illustrated in detail. Although this discussion is directed specifically to locking pins 52,54, it will be appreciated that this discussion is applicable by analogy to locking pins 48,50,56,58. Locking pin 52 is inserted through outer longitudinal slots 64,66 in probe portion 4 and inner longitudinal slots 68,70 in inner conduit 2, and is provided with locking pin heads 72,74. The width of outer longitudinal slots 64,66 is selected such that locking pin heads 72,74 have a diameter greater than the width of slots 64,66. Likewise, locking pin 54 is inserted through outer longitudinal slots 76,78 radially disposed in probe portion 4 and inner longitudinal slots 80,82 radially disposed in inner conduit 2 and is provided with locking pin heads (only one shown in phantom at 84). Thus, it will be appreciated that when the mechanically flexible transmitter is flexed, locating pins 52,54 are arranged to remain in their respective outer and inner longitudinal slots. However, the pin and slot arrangement allows inner conduit 2 and probe portion 4 to flex while maintaining their substantially fixed longitudinal relation. Moreover, this arrangement allows inner conduit 2 and probe portion 4 to flex while maintaining a substantially fixed radial spacing. It also will be appreciated that for each pin pair, since a first pin is offset and rotated 90° relative to the second pins, this pin pair arrangement also flexibly and substantially coaxially supports the first conduits within the second conduit.

Locating pins 48,50,52,54,56,58 are composed of a nonconductive material. In the preferred embodiment, locating pins 48,50,52,54,56,58 are composed of poly(-chlorotriflouroethylene). Thus, in constructing the flexible transmitter of the preferred embodiment, each locating pin may be produced by inserting a straight (headless) pin and applying a soldering iron having a concave shaped tip to each end of the straight pin to form respective locating pin heads. It also will be appreciated that the use of nonconductive materials does not affect the effective electrical capacitance relationship between inner conduit 2 and respective probe portion 4 and compensator portion 6.

Referring now to FIGS. 2 and 6, a preferred embodiment of the operational circuitry for the flexible transmitter and fluid level gauging probe of the present invention will be described. Electrical leads are provided from each of the conductive conduits to a circuit board 100 disposed in housing 10. Specifically, probe lead 102 is disposed between probe contact 104 on probe portion 4 and terminal 106 on circuit board 100. Compensator lead 108 is disposed between compensator contact 110 on compensator portion 6 and terminal 112 on circuit board 100. Inner conduit lead 114 is disposed between inner conduit contact 116 on inner conduit 2 and terminal 107 on circuit board 100. Compensator lead 108 is passed through fluid passages 44,46 (see e.g., FIGS. 2, 3 and 4) and through lead slot 118 in inner conduit 2. In the preferred embodiment, compensator lead 108 is composed of an insulated, shielded wire, e.g., a PTFE coated, shielded wire, to protect it from the hostile environment within the oil tank. Electrical shield lead 113 of compensator lead 108 is grounded to terminal 115 of circuit board 100.

Referring particularly to FIG. 6, a schematic diagram of the operational circuit of the preferred embodiment which receives signals from the probe portion 4 capacitance $C_p$ and the compensator 6 capacitance $C_c$ is illustrated. In the preferred embodiment, the operating circuit includes an oscillator for generating a saw-tooth voltage waveform LoZ, inverters $I_1$, $I_2$, an operational amplifier, and capacitors Cce, Cc, Cpe, Cp. Cce is a fixed reference value selected to equal the capacitance between the low impedance element (compensator portion 6) and the high impedance element (inner conduit 2) when empty. Likewise, Cpe is a fixed reference value selected to equal the capacitance between the low impedance element (probe portion 4) and the high impedance element (inner conduit 2) when empty. Capacitance Cp is the actual, continuous measured capacitance between probe portion 4 and inner conduit 2 during operation of the fluid level gauging probe. Likewise, capacitance Cc is the actual, continuous-measured capacitance between compensator portion 6 and inner conduit 2 during operation of the fluid level gauging probe. An output voltage signal Vo is generated according to the following equation:

$$Vo = -LoZ\frac{Cp}{Cc} + LoZ\frac{Cpe}{Cc} + Vo\frac{Cce}{Cc} \quad (1)$$

where LoZ = the low impedance peak-to-peak voltage generated by the oscillator.

Solving for Vo yields:

$$V_o = -L_oZ\frac{(C_p - C_{pe})}{(C_c - C_{ce})} \qquad (2)$$

Substituting $C_c = C_{ce} + (K-1)C_{ce}$ and $C_p = C_{pe} + (K-1)C_{pe} h/h_o$
so that $$V_o = -L_oZ\frac{(K-1)hC_{pe}}{h_o(K-1)C_{ce}}$$

where
 K = dielectric constant,
 $h_o$ = the length of probe portion 4, and
 h = actual height of fluid level as a function of the length of probe portion 4;

As a result, the (K−1) dielectric factor in the numerator cancels the (K−1) dielectric factor in the denominator. Consequently, $V_o$ is independent of variations in the dielectric constant and $$V_o = -L_oZ\frac{hC_{pe}}{h_oC_{ce}} \qquad (3)$$

Thus, it will be appreciated that the probe and compensator portion arrangement of the present invention effectively eliminates variation in $V_o$ due to variations in the dielectric constant K, and allows the flexible transmitter to continuously and accurately detect the level of a dielectric fluid whose properties may vary widely over a large range of temperatures and batch types.

Referring to FIG. 7, a flexible transmitter and fluid level gauging probe is shown disposed in a saddle-shaped, swept back engine oil tank. It will be appreciated that the mechanically flexible transmitter is flexible in multiple planes to allow insertion and removal therefrom for maintenance.

In an alternative embodiment, a flexible probe gauging transmitter and fluid level gauging probe of the present invention is adapted to an application wherein the dielectric properties of the fluid remain substantially constant during operation. In such an application, the comparator portion of the first embodiment, which detects a variable capacitance as a function of the dielectric property of the fluid during operation in the previous embodiment, can be replaced by a constant value reference capacitance, which is selected as a function of the fixed dielectric property of the fluid. It will be appreciated by those skilled in the art that for such an application the fluid level then can be determined as a function of the measured capacitance of a capacitance probe portion.

Referring to FIG. 8, the alternative embodiment of the flexible transmitter and fluid level gauging probe of the present invention is schematically illustrated in cross-section. In this embodiment, the mechanically flexible transmitter includes a first flexible electrically-conductive conduit member ("inner conduit") 202, a second flexible electrically-conductive conduit member ("probe conduit") 204, spacers 224, and locating pins 248,250,252,254. The design, composition and function of inner conduit 202, probe conduit 204, spacers 224 and locating pins 248,250,252,254 are substantially the same as the design, composition and function of respective corresponding inner conduit 2, probe conduit portion 4, spacers 24 and locating pins 48,50,52,54 of the previous embodiment. A nonconductive flexible sleeve 220 also is formed over probe conduit 204.

In yet another embodiment of the present invention, inner conduit 2 may be segmented to profile the flexible transmitter and fluid level gauging probe to the shape and volume of a tank, i.e. to produce a linear relationship between the fluid volume and probe capacitance as a function of the length of the probe transmitter.

Referring now to FIG. 9, a profiled flexible transmitter and fluid level gauging probe is shown in longitudinal crosssection. As in the previously described embodiments, the profiled mechanically flexible transmitter of the present embodiment includes a first flexible conductive conduit (inner conduit 202) and a second flexible conduit (probe portion 204). However, in the present embodiment the inner conduit is segmented to provided inner conduit portions 202A, 202B, 202C having respective diameters D1, D2, D3. Inner conduit portions 202A, 202B, 202C are composed of flexible conductive conduits, and are provided with electrical leads 201, 203 to form a continuous electrical element.

Each of respective inner conduit portions 202A, 202B, 202C is flexibly and substantially coaxially supported within probe portion 204 by respective spacers 224A, 224B, 224C. The design, composition and function of spacers 224A, 224B 224C is the same as the design, composition and function of spacers 24 in the above described embodiments.

Locating pin pairs P1, P2, P3, P4, P5, P6 are provided for maintaining respective inner conduit portions 202A, 202B, 202C in a substantially fixed longitudinal relationship. Specifically, respective locating pin pairs are provided at the proximate and distal ends of each of inner conduit portions 202A, 202B, 202C. The design, composition and function of locating pin pairs P1, P2, P3, P4, P5, P6 is substantially similar to the design, composition and function of the locating pins in the above described embodiments.

It will be appreciated that, because the radial spacing between respective inner conduits 202A, 202B, 202C and probe portion 204 varies along the length of the transmitter, the fluid level gauging probe of the present embodiment presents a flexible transmitter having a variable electrical capacitance per unit length of the transmitter. Therefore, inner conduit portions 202A, 202B, 202C can be selected so as to provide a linear relationship between the capacitance per unit length along the length of the flexible transmitter and the fluid volume of the tank per unit length along the length of the flexible transmitter. Accordingly, the mechanically flexible transmitter and fluid level gauging transmitter can be profiled to provide a linear relationship, measured in capacitance per unit volume, between the fluid level gauging probe and the fluid volume along the length of the flexible transmitter.

Therefore, it will be appreciated that the above described preferred embodiments provide all of the above stated objects and advantages of the present invention. The preferred embodiments provide a single, flexible, light weight transmitter and fluid level gauging probe which presents an externally nonconductive probe that can withstand a hostile environment. The flexible transmitter can continuously and accurately detect fluid levels of dielectric fluids whose properties vary widely over a large range of temperature gradients, and the transmitter can be designed to have a variable capacitance per unit length and can be profiled to the specific height and volume characteristics of a tank.

Numerous other embodiments and modifications will be apparent to those skilled in the art and it will be appreciated that the above description of the preferred embodiments is illustrative only, it is not intended to limit the scope of the present invention, which is defined by the following claims.

What is claimed is:

1. A fluid level gauging probe, comprising a first electrically-conductive conduct flexible in multiple planes flexibly supported within and separated by spacer means from a second conduit flexible in multiple planes to maintain a substantially constant radial distance therebetween, said second flexible conduit including an electrically-conductive probe portion forming a first electrical capacitance element with said first conduit, an electrically-conductive compensator conduit portion forming a second electrical capacitance element with said first conduit and an electrically insulative collar forming an insulating joint between said probe portion and said compensator portion.

2. A fluid level gauging probe recited in claim 1, wherein said first flexible conductive conduit, said probe portion and said compensator portion are composed of convoluted metal tubing.

3. A fluid level gauging probe recited in claim 1, wherein said first flexible conductive conduit is flexibly supported within said second flexible conduit by a plurality of nonconducting spacers.

4. A fluid level gauging probe recited in claim 3, wherein each spacer comprises a ring-shaped body portion disposed about said first flexible conductive conduit and a plurality of spoke members radially extending from said body portion for maintaining a space between said first flexible conductive conduit and said second flexible conduit.

5. A fluid level gauging probe recited in claim 4, wherein each spacer is composed of poly(tetrafluoroethylene).

6. A fluid level gauging probe recited in claim 4, wherein each spacer further comprises a spacer pin for fixing said spacer relative to said first flexible conductive conduit.

7. A fluid level gauging probe recited in claim 4, wherein each spacer comprises three radially extending spoke members arranged substantially 120° apart.

8. A fluid level gauging probe recited in claim 1, further comprising a plurality of locating pins radially disposed through said first flexible conductive conduit and said second flexible conduit for maintaining a substantially fixed longitudinal relationship therebetween.

9. A fluid level gauging probe recited in claim 8, wherein said locating pins are composed of poly(chlorotrifluoroethylene).

10. A fluid level gauging probe recited in claim 8, wherein said pins are arranged in pairs, each pair having a first pin disposed longitudinally offset and radially perpendicular to a second pin.

11. A fluid level gauging probe recited in claim 10, wherein a first pair is disposed at a first end of said first flexible conductive conduit for attaching said transmitter to a probe housing, a second pair is disposed at the other end of said probe portion proximate said collar, and a third pair is disposed at the distal end of said first flexible conducting conduit and said compensator portion.

12. A fluid level gauging probe recited in claim 8, wherein said first and second flexible conduits each are provided with radially disposed longitudinal slots for receiving said locating pins.

13. A fluid level gauging probe recited in claim 12, wherein each said locating pin comprising terminal pin heads having a width greater than the width of the longitudinal slots in said second flexible conduit.

14. A fluid level gauging probe recited in claim 1, wherein said collar is composed of poly(tetrafluoroethylene).

15. A fluid level gauging probe recited in claim 1, further comprising a electrically insulative sleeve formed over said probe portion and said compensator portion.

16. A fluid level gauging probe recited in claim 15, wherein said sleeve is composed of poly(tetrafluoroethylene).

17. A fluid level gauging probe recited in claim 15, wherein said sleeve is formed by a heat shrink material.

18. A fluid level gauging probe, comprising:
a housing having a flange for fixing said housing to a wall of a fluid container;
a fluid level gauging transmitter flexible in multiple planes fixed to said housing and disposed within said fluid container, said transmitter comprising a first flexible electrically-conductive conduit flexibly support within and separated by means from a second flexible conduit, said second flexible conduit including an electrically-conductive probe portion forming a first electrical capacitance member with said first conduit, an electrically-conductive compensator portion forming a second electrical capacitance member with said first flexible conduit and a collar forming an electrically insulating joint between said probe portion and said compensator portion; and
circuit means electrically connected to said first conduit, said probe portion and said compensator portion of said fluid level gauging transmitter for receiving signals from said first and second capacitance members, for measuring the respective capacitances of said first and second electrical capacitance members responsive to said signals and for determining a level of the fluid in said container as a function of the measured capacitance.

19. The fluid level gauging probe recited in claim 18, wherein said circuit means is disposed within said housing.

20. The fluid level gauging probe recited in claim 18, wherein said housing is composed of stainless steel.

21. The fluid level gauging probe recited in claim 18, said flexible probe gauging transmitter further comprising a flexible electrically insulative sleeve formed over said probe portion and said compensator portion.

22. The fluid level gauging probe recited in claim 18, wherein said first conduit is flexibly supported within said second conduit by a plurality of electrically insulative spacers.

23. The fluid level gauging probe recited in claim 18, further comprising a plurality of locating pins for maintaining a substantially fixed longitudinal relationship between said first and second conduits.

24. The fluid level gauging probe recited in claim 23, wherein said first and second flexible conduits each are provided with radially disposed longitudinal slots for receiving said locating pins.

25. The fluid level gauging probe recited in claim 24, wherein each said locating pin comprises terminal pin heads having a width greater than the width of the longitudinal slots in said second flexible conduit.

26. The fluid level gauging probe recited in claim 18, wherein said circuit means measures the capacitance of said first and second electrical capacitance members and generates a signal proportional to a level of fluid within said fluid level gauging transmitter as a function of the measured capacitances.

27. A fluid level gauging transmitter, comprising:
a first electrically conductive conduit flexible in multiple planes flexibly supported by spacer means within a second conduit flexible in multiple planes having an electrically conductive probe portion forming a first electrical capacitance member with said first conduit; and
a plurality of locating pins radially disposed through said first flexible conductive conduit and said second flexible conduit for maintaining a substantially fixed longitudinal relationship therebetween,
wherein said pins are arranged in pairs, each pair having a first pin disposed longitudinally offset and radially perpendicular to a second pin.

28. A fluid level gauging transmitter recited in claim 27, wherein a first pair of said pins is disposed at a first end of said first flexible conductive conduit for attaching said transmitter to a probe housing, and a second pair of said pins is disposed at a distal end of said first conduit and said probe portion.

29. A fluid level gauging transmitter, comprising:
a first electrically conductive conduit flexible in multiple planes flexibly supported by spacer means within a second conduit flexible in multiple planes having an electrically conductive probe portion forming a first electrical capacitance member with said first conduit; and
a plurality of locating pins radially disposed through said first flexible conductive conduit and said second flexible conduit for maintaining a substantially fixed longitudinal relationship therebetween,
wherein said first and second flexible conduits each are provided with radially disposed longitudinal slots for receiving said locating pins.

30. A fluid level gauging transmitter recited in claim 29, wherein each said locating pin comprising terminal pin heads having a width greater than the width of the longitudinal slots in said second flexible conduit.

31. A fluid level gauging probe, comprising:
a housing having a flange for fixing said housing to a wall of a fluid container;
a transmitter flexible in multiple planes fixed to said housing and disposed within said fluid container, said transmitter comprising a first electrically-conductive conduit flexible in multiple planes flexibly supported by spacer means within a second conduit flexible in multiple planes, said second flexible conduit including an electrically-conductive probe portion forming an electrical capacitance member with said first conduit;circuit means connected to said first conduit and said probe portion for measuring the capacitance of said electrical capacitance member and for determining a level of the fluid in said container as a function of the measured capacitance; and
a plurality of locating pins for maintaining a substantially fixed longitudinal relationship between said first and second conduits,
wherein said first and second flexible conduits each are provided with radially disposed longitudinal slots for receiving said locating pins.

32. The fluid level gauging probe recited in claim 31, wherein each said locating pins comprises terminal pin heads having a width greater than the width of the longitudinal slots in said second flexible conduit.

33. A fluid level gauging transmitter, comprising:
a first electrically-conductive conduit flexible in multiple planes flexibly supported by spacer means within a second conduit flexible in multiple planes having an electrically-conductive probe conduit portion, said first conduit comprising at least two flexible electrically conductive segments in electrical contact, said segments having respective segment diameters; and
a plurality of locating pins radially disposed through said first and second flexible conduib 51035020.002 ts for maintaining a substantially fixed longitudinal relationship therebetween,
wherein each said locating pins comprises terminal pin heads having a width greater than the width of longitudinal slots in said second flexible conduit.

34. A fluid level gauging transmitter recited in claim 33, wherein each said locating pin comprises terminal pin heads having a width greater than the width of longitudinal slots in said second flexible conduit.

* * * * *